(12) United States Patent
Alves et al.

(10) Patent No.: US 6,554,250 B2
(45) Date of Patent: Apr. 29, 2003

(54) FLAP VALVE DEVICE AND REGULATION ASSEMBLY

(75) Inventors: Anthony Alves, Holtzwihr (FR); Richard Komurian, Turckheim (FR)

(73) Assignee: Mark IV Systemes Moteurs (Societe Anonyme), Courbevoie (FR)

( * ) Notice: Subject to any disclaimer, the term of this patent is extended or adjusted under 35 U.S.C. 154(b) by 0 days.

(21) Appl. No.: 09/795,325

(22) Filed: Mar. 1, 2001

(65) Prior Publication Data

US 2001/0019119 A1 Sep. 6, 2001

(30) Foreign Application Priority Data

Mar. 1, 2000 (FR) .............................. 00 02644

(51) Int. Cl.⁷ .............................................. F16K 1/226
(52) U.S. Cl. ...................................... 251/305; 123/337
(58) Field of Search .................... 251/305, 306, 251/307, 308; 123/336, 337

(56) References Cited

U.S. PATENT DOCUMENTS

| | | | |
|---|---|---|---|
| 3,568,975 A | | 3/1971 | Obermaier et al. |
| 3,627,261 A | * | 12/1971 | Ludeman .................... 251/305 |
| 3,750,698 A | * | 8/1973 | Walchle et al. ............. 137/375 |
| 3,931,955 A | * | 1/1976 | Jacobs ........................ 251/305 |
| 4,273,308 A | | 6/1981 | Nakai |
| 4,771,740 A | | 9/1988 | Koike |
| 5,081,972 A | * | 1/1992 | Daly et al. .................. 123/337 |
| 5,465,696 A | * | 11/1995 | Gmelin ........................ 123/337 |
| 5,531,205 A | * | 7/1996 | Cook et al. ................. 251/306 X |
| 5,575,256 A | * | 11/1996 | Peters et al. ................ 123/337 |
| 5,615,861 A | | 4/1997 | Pollmann et al. |
| 5,673,895 A | | 10/1997 | Kaneko |
| 5,715,782 A | | 2/1998 | Elder |
| 6,029,949 A | * | 2/2000 | Brown et al. ............... 251/305 |
| 6,123,318 A | * | 9/2000 | Forbes et al. ............. 251/306 X |
| 6,135,418 A | * | 10/2000 | Hatton ....................... 251/306 |

FOREIGN PATENT DOCUMENTS

| | | |
|---|---|---|
| EP | 0 947 681 | 10/1999 |
| JP | 03 018632 | 1/1991 |

* cited by examiner

Primary Examiner—Gene Mancene
Assistant Examiner—Eric Keasel
(74) Attorney, Agent, or Firm—Young & Thompson

(57) ABSTRACT

The present invention relates to a flap valve device and a regulation assembly comprising such devices. A pivoting flap valve device has a flap body substantially in the form of a disc mounted on a support and control axle, for the regulation of the circulation of a fluid, particularly a liquid, between an upstream conduit portion and a downstream conduit portion. The flap body (2) is mounted centered on the axle (3), in that the two conduit portions (4 and 5) are axially offset relative to each other and in that the internal surfaces (7, 7') of the opposed offsets resulting from the axial offset or non-alignment of the portions (4 and 5) constitute bearing surfaces (7, 7') for two complementary seat portions (6, 6') for the flap body (2), located on opposite sides of the axle (3) carrying the flap body (2).

8 Claims, 3 Drawing Sheets

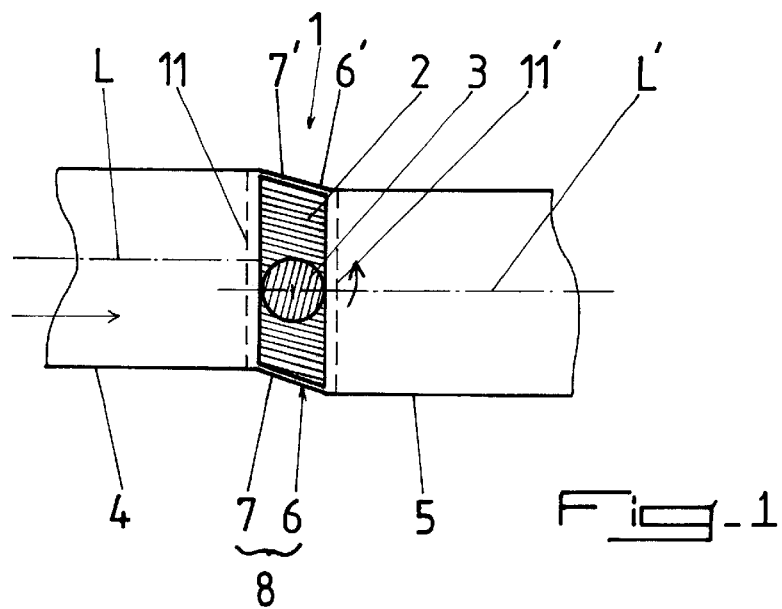
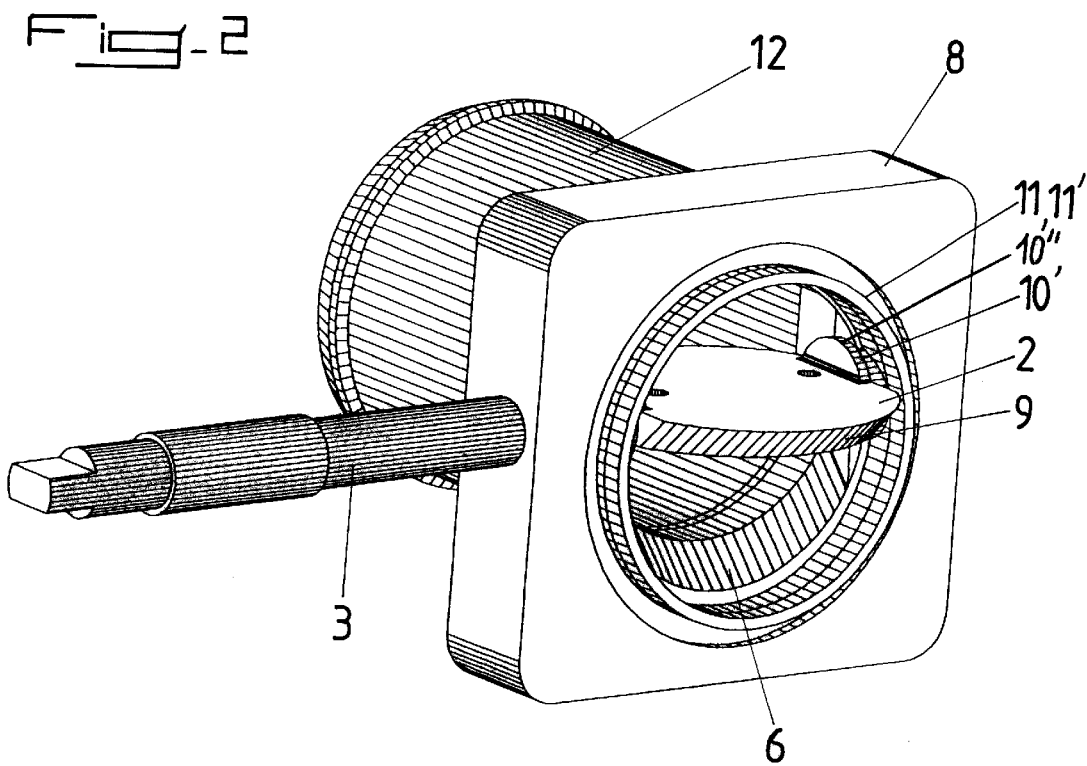

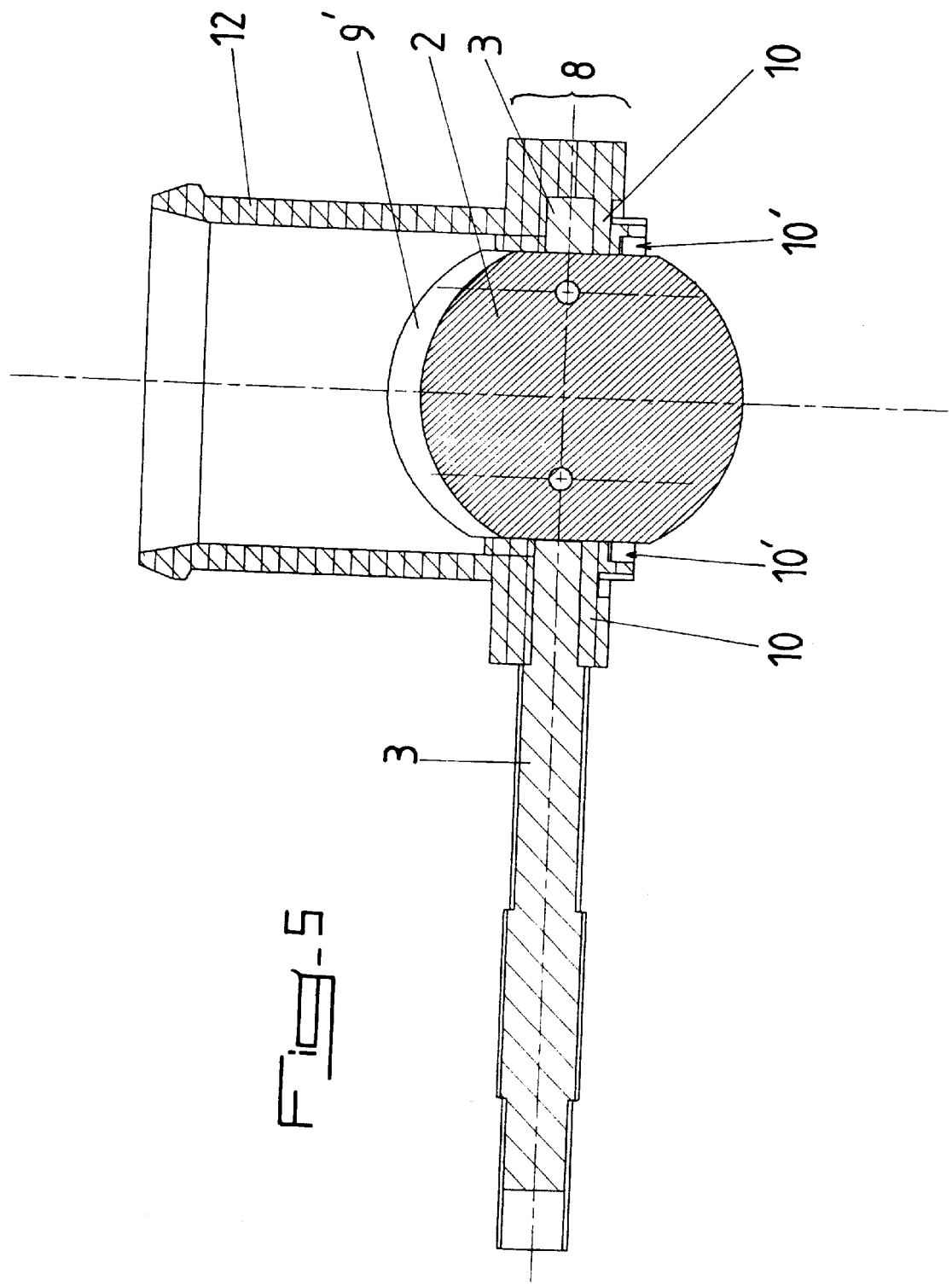

FLAP VALVE DEVICE AND REGULATION ASSEMBLY

The present invention relates to the field of regulation of the flow of fluids, gases, or liquids, in conduits, pipes, tubes or the like, and has for its object a flap valve device, as well as a regulation assembly comprising several such devices.

The present invention seeks essentially to provide a valve device to control a flow in a conduit or the like, of simple structure easy to make, if desired easy to install, permitting obtaining good sealing in the closed condition and requiring limited effort to manipulate it.

Moreover, said valve device should have a robust structure permitting resisting particularly vibrations and permitting implantation in an aggressive environment, for example below the hood of an automotive vehicle.

To this end, the present invention provides a pivoting flap valve device, with a flat body substantially in the form of a disc mounted on a support and control axle, for the regulation of the circulation of a fluid, particularly a liquid, between an upstream conduit portion and a downstream conduit portion, characterized in that the flap body is mounted centered on the axle, in that the two portions of conduit are axially spaced apart relative to each other and in that the internal surfaces of the opposed set-offs resulting from said axial offset or non-alignment of the portions, constitute bearing surfaces for two complementary seat portions for the flap body, located on opposite sides of the axle carrying said flap body.

The invention will be better understood from the following description, which relates to preferred embodiment, given by way of non-limiting examples, and explained with reference to the accompanying drawings, in which:

FIG. 1 is a schematic representation in side elevation and cross-section of a flap valve device according to a first embodiment of the invention;

FIG. 2 is a perspective view of a flap valve device according to a second embodiment of the invention;

FIG. 5 is a cross-sectional view on the B—B of the device shown in FIG. 4.

Figure 3:
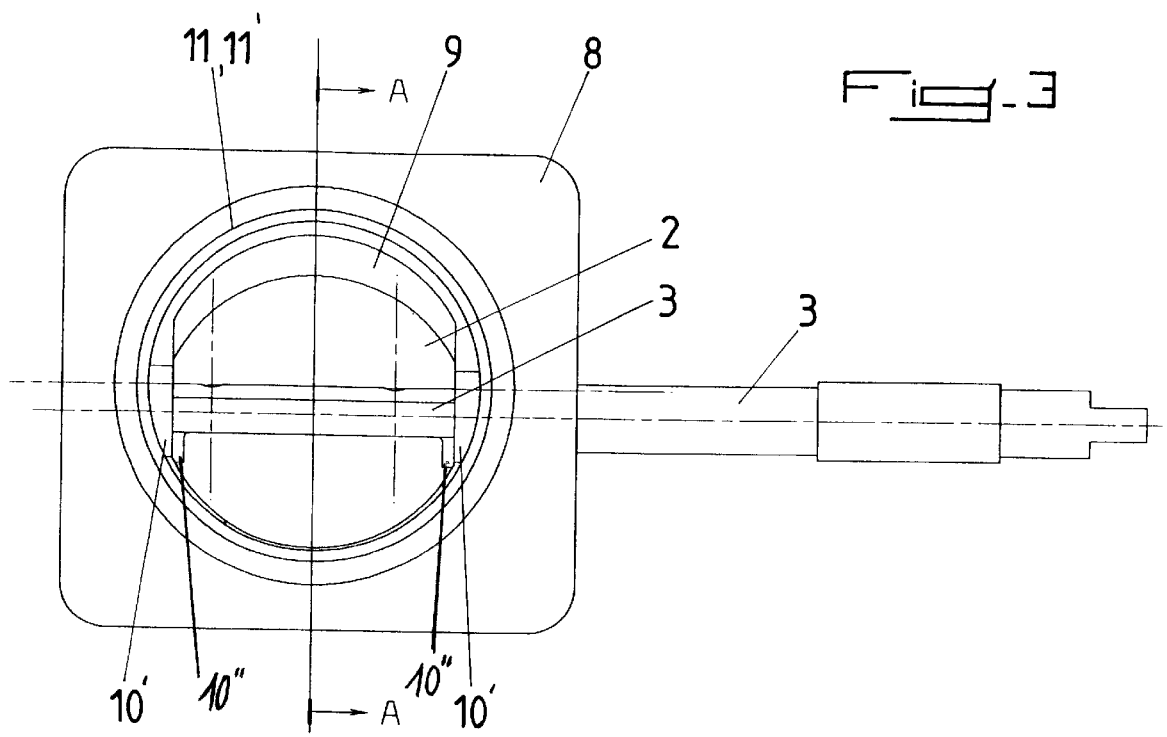
FIG. 3 is a front elevational view of a flap valve device similar to that shown in FIG. 2.

FIG. 1 of the accompanying drawings shows schematically an embodiment of the pivoting flap valve device 1, with a flap body 2 substantially in the form of a disc mounted on a support and control axle 3, for the regulation of the circulation of a fluid, particularly liquid, between an upstream conduit portion 4 and a downstream conduit portion 5.

According to the invention, the flap body 2 is mounted centered on the axle 3, the two conduit portions 4 and 5 are axially offset relative to each other and the internal surfaces 7, 7' of the opposed set-offs resulting from said axial offset or non-alignment of the portions 4 and 5, constitute bearing surfaces 7, 7' for two complementary seat portions 6, 6' for the flap body 2, located on opposite sides of the axle 3 carrying said flap body 2.

Given the nature of the mutual offset of the two conduit portions 4 and 5, the opposed discontinuity 6 will have a maximum width or depth in line with the plane containing the two longitudinal axes L and L' and, theoretically, in the case of right angle offsets, a zero width at the center of the support and control axle 3.

Under these conditions, the bearing surfaces 7 and 7' of the two complementary seat portions 6 and 6' constitute respectively seen in the upstream direction for one and in the downstream direction for the other, at least portions of opposed lunette crescents, symmetrical relative to the axle 3 carrying the flat body 2 and whose ends are directed toward said axle 3.

Figure 4:
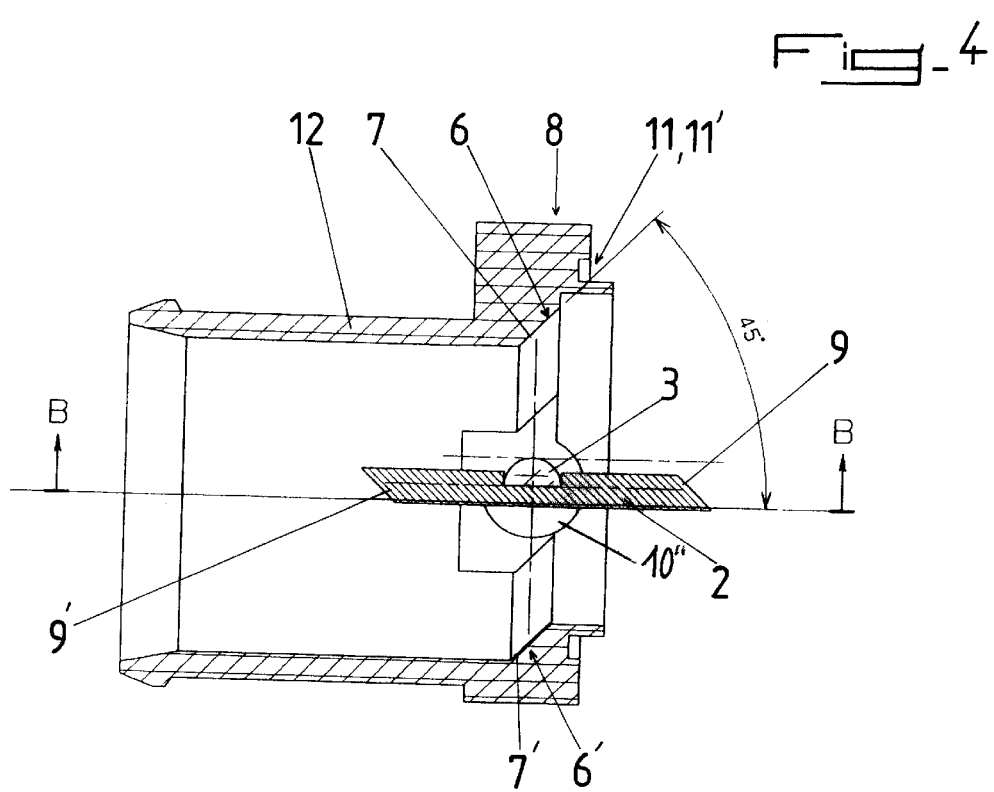
FIG. 4 is a cross-sectional view on the line A—A of the device shown in FIG. 3.

According to a preferred modification of the invention, shown particularly in FIGS. 1, 2 and 4 of the accompanying drawings, the two complementary seat portions 6 and 6' have internal bearing surfaces 7, 7' inclined relative to a plane perpendicular to the longitudinal axes L and L' of the two conduit portions 4 and 5 to constitute a passage portion 8 of non-zero thickness connected said two conduit portions 4 and 5 and whose internal surface ensures the continuity and carries out the connection between the internal surfaces of the two conduit portions 4 and 5 mentioned above, at least at the level of the bearing surfaces 7 and 7' of the two complementary seat portions 6 and 6'.

Moreover, to carry out a closure of the flap valve device 1 with efficient closing of the passage, the flap body 2 has bevelled edges 9 and 9', with opposite slopes on opposite sides of the support and control axle 3 and with summit angles of the bevels which decrease in a direction away from said axle 3, starting with practically perpendicular edges adjacent said axle 3, said bevelled edges 9, 9' being adapted to come into bearing shape-matingly and in intimate contact with the internal surfaces 7 and 7' of the respective corresponding seat portions 6 and 6'.

According to another characteristic of the invention, not shown in the accompanying drawings, the bevelled edges 9 and 9', and in particular the surfaces of the bevelled edges that come into bearing against the surfaces 7 and 7' of the seat portions 6 and 6', are coated with a sealing coating or layer.

However, it is not necessary to have such supplemental coatings or layers when a good quality sealing is not desired (presence of loss upon closure), given that the surface contact of the bevelled edges 9, 9', the bearing surfaces 7, 7' of the periphery of seats 6, 6' associated with the baffles resulting from the offsets, already gives rise to good sealing, even without special provision.

To reduce the sealing problems in the contact zones between the seat portions 6 and 6' and the openings that open internally of the opposite mounting and guiding bearings 10 of the support and control axle 3, the device 1 can comprise, at least at the level of the passage portion 8, projections 10' of the bearings 10 for the support and control axle 3, which protrude into said passage portion 8, laterally delimiting at this point the cross-section of passage by two parallel chords perpendicular to the axle 3 and thereby reducing the bearing surfaces 7, 7' of the complementary seat portions 6, 6' (see FIGS. 2, 3 and 5), sealing flanks 10" in the form of half-discs being connected or formed on the flat body 2 and coming into intimate application against the surfaces of the internal edges of said projections 10'.

The flanks 10" thus cover, in a sealing manner, and preferably on the upstream side, the projections 10', these latter preferably also having a circular external contour permitting their covering by the flanks 10" of said flap body 2 without provided an obstacle to the rotation or pivoting of this latter. The flanks 10" will preferably consist of a resilient sealing material, such as for example rubber, and could if desired be formed continuously with the sealing coatings of the beveled edges 9, 9' of the flap body 2. There is thus obtained both a continuous sealing in the direction of flow, as well as radial sealing at the level of the bearings 10.

According to a preferred embodiment of the invention, of which a modification is shown in FIG. 1 of the accompanying drawings, the passage portion 8 can be in the form of an insert or an intermediate element in which is pre-mounted the support and control axle 3 with the flap body 2, said insert or intermediate element being provided with interfaces 10, 10' for connection, for a sealed connection with the upstream conduit portion 4 and downstream conduit portion 5.

As a modification, said passage portion 8 could also constitute an insert emplaced before assembly of the two conduit portions 4 and 5 with each other, in a reinforcement or a groove provided in the two portions 4 and 5, and blocked in position after assembly, if desired by clamping, in the junction zone of said two portions. In this case, the passage portion 8 can be reduced to a simple ring carrying the only seat portions 6, 6'.

According to another modified embodiment, the insert or intermediate element is prolonged, on the upstream or downstream side, by a connection ferrule 12 for a conduit portion 4 or 5, particularly for an assembly by ensleeving or encasing with such a portion.

It will be noted that the different modified embodiments of the invention described above, are easily producible by molding by injection with thermoplastic materials, can be mounted in different ways (welding, screwing, blocking by integration and clamping, gluing) as a function of its nature (insert, intermediate connection element or piece, connected element or piece) and of its constituent material, requiring only a limited effort for actuating the flap (central axle), permitting passing from the open position to the closed position with a rotation limited to 45°, giving rise to only limited disturbance of the flow in the open position (beveled edges=aerodynamic shape) and permitting the use of a return spring for safety in the closed position, the portions of the seat 6 and 6' forming abutments in rotation.

The invention also has for its object an assembly for the regulation of the flow of fluid between a plurality of upstream and downstream conduit portions communicating with each other two by two, characterized in that it comprises for each pair of upstream and downstream conduit portions 4 and 5, a pivoting flap valve device 1 as described above, the flap bodies 2 of these different devices 1 being all mounted on a same support and control axle 3.

As a function of the regulations to be carried out, and of their interdependence or independence, it could be provided that the flap bodies 2 have sizes, shapes and/or inclinations on the support and control axle 3 that are different.

Of course, the invention is not limited to the embodiments described and shown in the accompanying drawings. Modifications remain possible, particularly as to the construction of the various elements or by substitution of technical equivalents, without thereby departing from the scope of protection of the invention.

What is claimed is:

1. A pivoting flap valve device comprising an upstream conduit portion, a downstream conduit portion, a disc-shaped flap body for regulating circulation of a fluid between said upstream conduit portion and said downstream conduit portion, said disc-shaped flap body being mounted centered on a control and support axle, said upstream and downstream conduit portions having respective offset axes so as to form two seat portions for said flap body, said seat portions being located on opposite sides of said axle and being symmetrical relative to said axle, said seat portions having a shape of at least a portion of a crescent when seen in respective axial directions, said upstream conduit portion and said downstream conduit portion being connected by an intermediate passage portion having an axial length, said seat portions being inclined relative to said axes of said upstream conduit portion and downstream conduit portion and forming at least respective portions of an internal surface of said passage portion, said flap body having beveled edges with opposed slopes on opposite sides of said control and support axle, said beveled edges being adapted to come into shape-mating sealing contact with said seat portions.

2. The flap valve device of claim 1, wherein said seat portions have an inclination relative to said axes of said upstream conduit portion and downstream conduit portion which decreases from a maximum angle in a plane containing said axes of said upstream conduit portion and downstream conduit portion towards said control and support axle, said beveled edges of said flap body having a correspondingly variable inclination so as to come into shape-mating contact with said seat portions in a closed position of said valve device.

3. The flap valve device according to claim 1, wherein the surfaces of the beveled edges that come into bearing against the seat portions are coated with a sealing layer.

4. The flap valve device according to claim 1, further comprising, at least in said passage portion, bearings of the support and control axle, protruding into said passage portion, delimiting laterally the cross-section of the passage by two parallel chords perpendicular to the axle and accordingly reducing the area of the seat portions, sealing flanks in the form of half-discs being formed on the flap body and coming into sealing contact with said bearings.

5. The flap valve device according to claim 1, wherein the passage portion is in the form of an intermediate element in which is premounted the support and control axle with the flap body, said intermediate element being provided with interfaces for sealed connection with portions of the upstream conduit portion and downstream conduit portion.

6. The flap valve device according to claim 5, wherein the intermediate element is prolonged, from the upstream or downstream side, by a ferrule for connection to a respective conduit portion.

7. The flap valve device according to claim 1, wherein said axes of said upstream and downstream conduit portions are parallel and spaced apart.

8. The flap valve device of claim 7, wherein said seat portions meet said upstream and downstream conduit portions in obtuse angles in the plane that contains the axes of said upstream and downstream conduit portions.

* * * * *